United States Patent
Stockton

(10) Patent No.: US 8,209,059 B2
(45) Date of Patent: Jun. 26, 2012

(54) THERMOSTATIC CONTROLLER

(75) Inventor: John Stockton, Austin, TX (US)

(73) Assignee: Zeta Communites, Zero Energy Technology & Architecture, San Francisco, CA (US)

( * ) Notice: Subject to any disclaimer, the term of this patent is extended or adjusted under 35 U.S.C. 154(b) by 88 days.

(21) Appl. No.: 12/723,553

(22) Filed: Mar. 12, 2010

(65) Prior Publication Data
US 2010/0235005 A1 Sep. 16, 2010

Related U.S. Application Data

(60) Provisional application No. 61/160,121, filed on Mar. 13, 2009.

(51) Int. Cl.
G05B 21/00 (2006.01)
G05B 13/00 (2006.01)
G05B 15/00 (2006.01)
G01M 1/38 (2006.01)
G05D 23/19 (2006.01)
G05D 22/02 (2006.01)
F24F 3/14 (2006.01)
F24F 6/00 (2006.01)
F24F 11/04 (2006.01)
F24F 11/06 (2006.01)
F25B 29/00 (2006.01)
B60H 1/32 (2006.01)

(52) U.S. Cl. ........ 700/278; 165/223; 165/224; 165/247; 165/257; 165/291; 236/44 C; 236/91 C; 236/91 D

(58) Field of Classification Search .......... 700/276–278; 62/93, 132, 157, 159, 186, 231; 165/200, 165/201, 222–224, 240, 244, 246–248, 253, 165/257, 279, 287, 288, 291; 236/44 R, 236/44 A, 44 C, 91 R, 91 C, 91 D
See application file for complete search history.

(56) References Cited

U.S. PATENT DOCUMENTS

| | | | | |
|---|---|---|---|---|
| 4,595,139 A | * | 6/1986 | Levine | 236/44 R |
| 4,735,054 A | * | 4/1988 | Beckey | 62/93 |
| 5,887,651 A | * | 3/1999 | Meyer | 165/223 |
| 6,070,110 A | * | 5/2000 | Shah et al. | 700/278 |
| 7,575,179 B2 | * | 8/2009 | Morrow et al. | 236/91 D |
| 7,640,761 B2 | * | 1/2010 | Garrett et al. | 62/186 |
| 2009/0186570 A1 | * | 7/2009 | Riggins | 454/200 |

* cited by examiner

*Primary Examiner* — Crystal J Barnes-Bullock
(74) *Attorney, Agent, or Firm* — Haynes and Boone, LLP

(57) ABSTRACT

In an energy efficient building, a thermostatic controller receives temperature and humidity input signals indicative of an inside, outside and air mass buffer. According to one or more algorithms, the thermostatic controller controls the operations of various actuators, such as blower speed, a fresh air intake vent damper, an exhaust vent and a heat pump, so as to adjust the internal climate of the energy-efficient building towards a control point (e.g., an inside temperature and humidity comfort level).

1 Claim, 3 Drawing Sheets

FIG. 2

| State | 00 | 01 | 02 | 03 | 04 | 05 | 06 | 07 | 08 | 09 | 0A | 0B | 0C | 0D | 0E | 0F | 10 | 11 |
|---|---|---|---|---|---|---|---|---|---|---|---|---|---|---|---|---|---|---|
| Inside Temp | tINS<tSET − tCOM | | | | tINS=>tSET − tCOM .AND. tINS<tSET | | | | tINS=>tSET .AND. tINS<tSET + tCOM | | | | tINS>tSET + tCOM | | | | >90 | <55 |
| Meta-State | HEAT | | | | WARM | | | | COOL | | | | CHILL | | | | VAC | VAC |
| Basement Temp | <tS | >tS | >tS | >tS | <tS | >tS | <tS | >tS | <tS | <tS | >tS | >tS | <tS | <tS | >tS | >tS | | |
| Outside Temp | >60 | >60 | <60 | >60 | <60 | >60 | <60 | >60 | <60 | >60 | <60 | >60 | <60 | >60 | <60 | >60 | | |
| HVAC Fan | 1 | 1 | 1 | 1 | 0 | 0 | 0 | 0 | 0 | 0 | 0 | 0 | 1 | 1 | 1 | 1 | 1 | 1 |
| Heat Pump | 1 | 0 | 0 | 0 | 0 | 0 | 0 | 0 | 0 | 0 | 0 | 0 | 0 | 0 | 0 | 1 | 1 | 1 |
| Changeover Valve | 0 | 0 | 0 | 0 | 0 | 0 | 0 | 0 | 0 | 0 | 0 | 0 | 0 | 0 | 0 | 1 | 0 | 1 |
| Skylight Vent | 0 | 0 | 0 | 0 | 0 | 1 | 0 | 1 | 1 | 1 | 1 | 1 | 1 | 1 | 1 | 1 | 0 | 0 |
| Fresh Air Vent | 0 | 1 | 0 | 1 | 0 | 0 | 0 | 0 | 0 | 0 | 0 | 0 | 0 | 0 | 0 | 0 | 0 | 0 |

THERMOSTATIC CONTROLLER

CROSS-REFERENCE TO RELATED APPLICATIONS

The present application is related to, and claims priority of, U.S. provisional patent application ("Parent Provisional Application"), Ser. No. 61/160,121, entitled "Thermostatic Controller," naming as inventor, John Stockton, filed on Mar. 13, 2009. The Parent Provisional Application is hereby incorporated by reference in its entirety.

BACKGROUND OF THE INVENTION

Field of the Invention

The present invention relates to climatic control inside a building, such as a dwelling. In particular, the present invention relates to a thermostatic controller for an energy efficient building.

SUMMARY

In an energy efficient building, a thermostatic controller receives temperature and humidity input signals indicative of an inside, outside and air mass buffer. According to one or more algorithms, the thermostatic controller controls the operations of various actuators, such as blower speed, a fresh air intake vent damper, an exhaust vent and a heat pump, so as to adjust the internal climate of the energy-efficient building towards a control point (e.g., an inside temperature and humidity comfort level).

BRIEF DESCRIPTION OF THE DRAWINGS

FIG. 2 is a table showing control algorithms for actuators, such as blower, heat pump, attic vent (exhaust), and fresh air intake (storage plenum), according to target control points (i.e., indoor temperature), storage plenum temperature and outside temperature, in accordance with one embodiment of the present invention.

DETAILED DESCRIPTION OF THE PREFERRED EMBODIMENTS

The present invention provides a control system which is particularly useful in energy efficient buildings. In one embodiment, a thermostatic controller is provided for an energy efficient building, such as the type of buildings described in U.S. provisional patent application ("Copending Provisional Application"), Ser. No. 61/080,634, entitled "ZERO NET ENERGY SYSTEM AND METHOD," filed on Jul. 14, 2008. The Copending Provisional Patent Application is hereby incorporated by reference in its entirety to provide background relating to energy efficient buildings.

Figure 1:
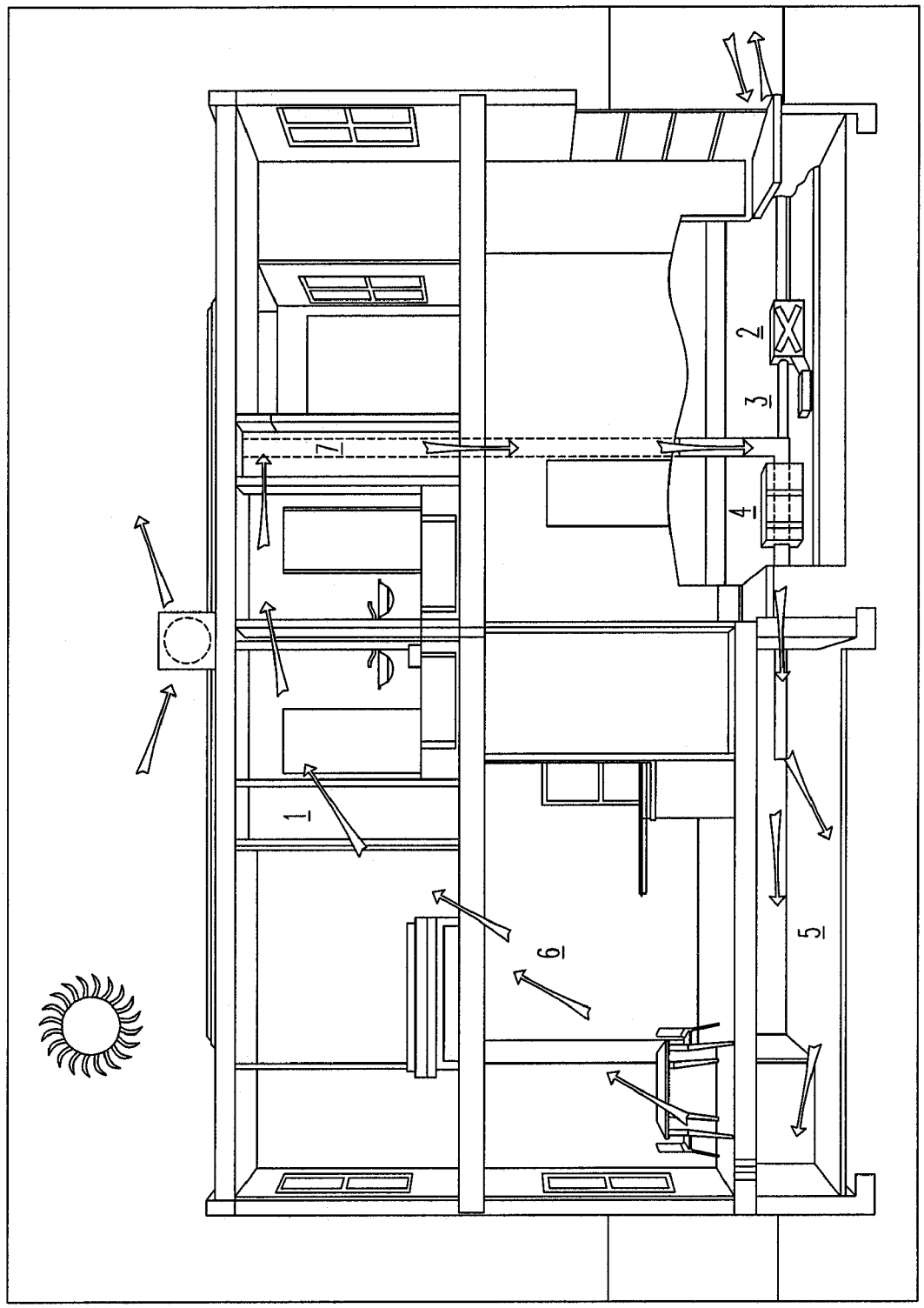
FIG. 1 shows a building having an exemplary zero net energy system, in accordance with one embodiment of the present invention.

FIG. 1 shows a building having an exemplary zero net energy system, in accordance with one embodiment of the present invention. As shown in FIG. 1, a building, such as that assembled from pre-fabricated components, is erected on a foundation. An inlet 1 draws fresh air from the exterior into the building via an intake duct at the ground level.

A quantity of incoming air is introduced into the main air circulation loop by way of an air handler 2-4 (e.g., 15% incoming to 85% re-circulated air), as needed. Necessary actuators, such as dampers and vents 2, are provided to enable mixing of the intake air with the air already in circulation. The air handler may include a variable speed blower 3 and one or more filters 4 (e.g., a HEPA filter) so as to reduce particulates in the circulated air. A fan coil is provided to heat or cool the air mixture according to the temperature settings determined in the control system. In one embodiment, the fan coil and, optionally, the air circulation, is enabled or powered by a heat pump As shown also in FIG. 1, the mixed air is provided to a thermal storage plenum 5, which is preferable also part of a basement. The thermal storage plenum is designed to allow a substantial air mass to accumulate. From the thermal storage plenum, the air is circulated throughout the house to heat or cool the living spaces 6. The circulated air is collected via a return duct 7, preferably located in a stair well, and recycled back to the space at the ground level where the incoming air is mixed.

According to one embodiment of the present invention, a thermostatic controller controls heating and cooling based on indoor, storage plenum, and outside air temperatures to control a variety of actuators, including a multi-stage heat pump, a fresh air intake vent, operations of a blower and an active roof vent. The thermostatic controller may be powered by 24 volts AC and the input variables include the indoor, outside and storage plenum temperatures, and input signals from one or more humidity sensors and a rain sensor. The output signals of the thermostatic controller controls the actuators over a 24 volts AC systems, either directly or through a local network.

The thermostatic controller may include a communication port that allows remote programming, monitoring and reporting over a network (e.g., a local area network or the internet). In one embodiment, the thermostat controller includes appropriate timing delays to accommodate operational requirements of the actuators (e.g., delayed start-up for proper heat pump operation and freeze protection). The thermostatic controller may have a user interface for a user to control an inside temperature of the building using mechanical or electronic keypad or switches (e.g., "soft" keypad displayed on an touch-sensitive input pad) and an liquid crystal display (LCD) for displaying a firmware revision level, system information and status, and system parameter and control values (e.g., various temperatures, and operation status of the actuators). In one embodiment, a user may set control points and basic temperature settings (e.g., temperature may be controlled between 60° F. to 90° F.), and may enable a vacation mode, in which the actuators are only activated when the inside temperature falls outside of a wide range between a highest temperature and lowest temperature. In one embodiment, a user can select a night time mode which will allow a slight reduction in indoor air temperature during selected night time hours.

Based on the values of the input variables (e.g., a combination of the indoor, storage plenum, and outside air temperatures, the humidity readings and reading of the rain sensor), the actuators are activated to bring the inside climate to the target control points. In addition, an override mode allows manual control of the heat pump, heating or cooling of the outside (fresh) air brought into the building, the mixing percentage of fresh air and re-circulated air, opening and closing of the roof vent, and the blower speed.

FIG. 2 shows Table 1 illustrating control algorithms for actuators, such as blower or fan for HVAC (i.e., heating, ventilation and air conditioning), heat pump, an attic or skylight fan (for expelling exhaust), and fresh air intake (e.g., in the storage plenum), according to target control points (i.e., indoor temperature), storage plenum temperature and outside temperature, in accordance with one embodiment of the present invention. Table 1 includes the logical control signals (i.e., "on" or "off", represented by "1" or "0", respectively) in five (5) temperature control regions or "meta-states" for (a) the HVAC fan, (b) the heat pump, (c) a change-over or pressure control valve, (d) a skylight vent, and (e) a fresh air vent. The five control regions are (a) "heat", (b) "warm", (c) "cool", (d) chill and (e) vacation. In this example, the "vacation" control region is divided into a "greater than 90°" and a "less than 65°" control sub-regions. In the "greater than 90°" control sub-region, both the HVAC fan and the heat pumps are on. In the "less than 55°" control sub-region, in addition to the HVAC fan and the heat pumps being on, the change-over valve is also open.

As shown in Table 1, in the "heat" region, the inside temperature ($t_{INS}$) is brought up to a pre-set temperature ($t_{SET}$ or $t_S$), whenever the inside temperature falls a predetermined temperature or margin ($t_{COM}$) below the pre-set temperature. In the "heat" region, the control signals also depend on whether or not the basement temperature is less than the pre-set temperature, and whether or not the outside temperature exceeds 60°. For instance, when the basement temperature is less than the pre-set temperature and when the outside temperature is greater than 60°, the heat pump is turned off and the fresh air vent is turned on to bring in air from the outside, so as to take advantage of the warmer outside temperature. In Table 1, the "warm" region maintains the inside temperature above the pre-set temperature less the pre-determined temperature. Similarly, the "cool" region maintains the inside temperature between the pre-set temperature and the pre-set temperature plus the pre-determined temperature. The "chill" region maintains the inside temperature below the pre-set temperature plus the pre-determined temperature.

Figure 3:
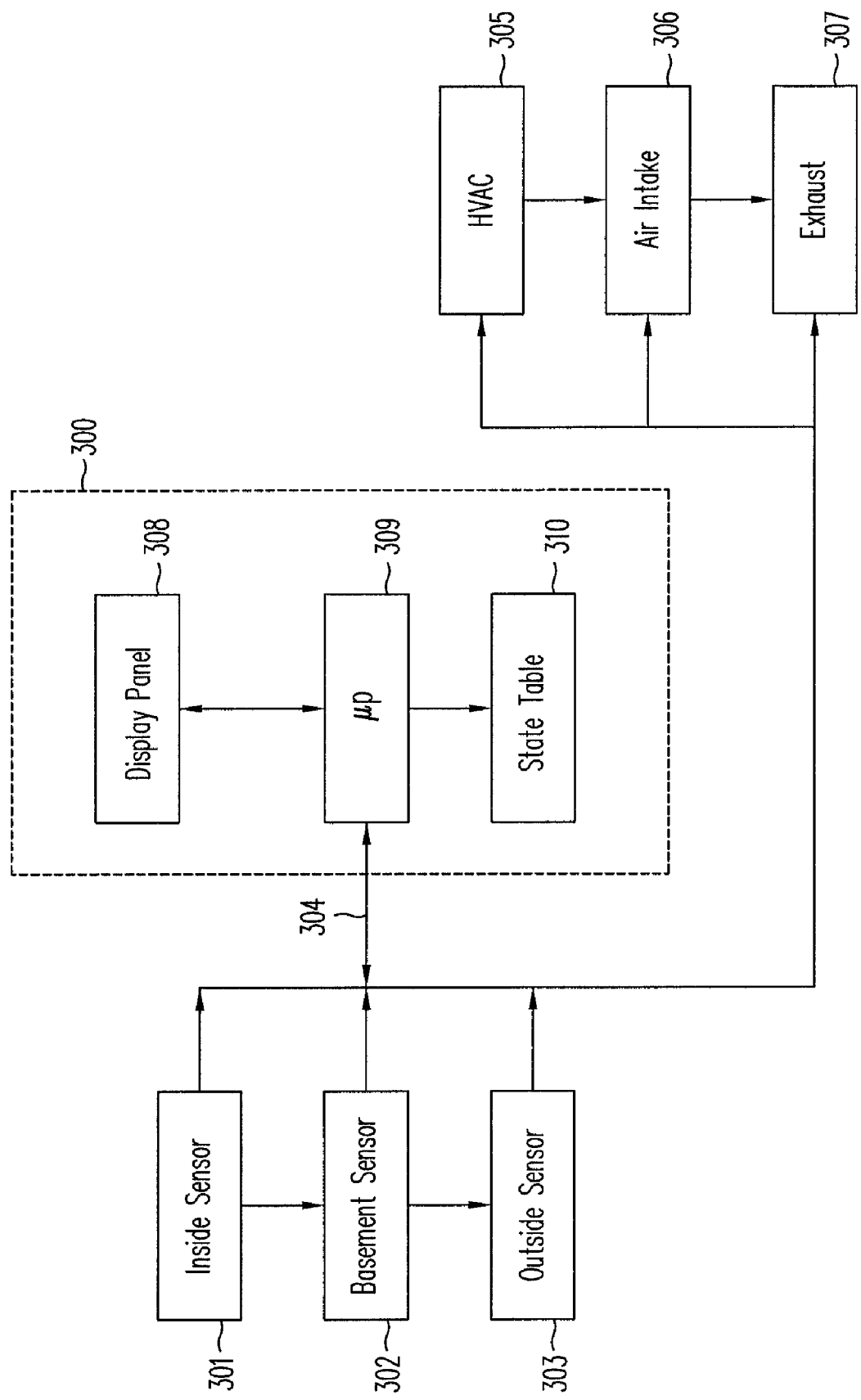
FIG. 3 is a block diagram of a system using a thermostatic controller according to one embodiment of the present invention.

FIG. 3 is a block diagram of a system using a thermostatic controller according to one embodiment of the present invention. As shown in FIG. 3, thermostatic controller 300 receives signals from sensors located at various points inside the building (e.g., inside temperature sensor 301, basement temperature sensor 302, and outside temperature sensor 303) over a communication channel 304, which may be a wired or wireless local area communication network or electrical wiring. Controller 300 includes display panel 308 with a small keypad to interact with a user, for example, to set various system parameters (temperature settings, control regions). Controller 300 preferably includes a state machine, such as an application specific integrated circuit or a general purpose microprocessor (e.g., microprocessor 309). Controller 300 is driven by a stored program 310 (e.g., a state table, such as that shown in FIG. 2), which controls the operation of the state machine. The stored program activates control signals to various actuators, such as HVAC 305, fresh air intake system 306 and exhaust elimination system 307.

The above detailed description is provided to illustrate specific embodiments of the present invention and is not intended to be limiting. Numerous variations and modifications within the scope of the present invention are possible. The present invention is set forth in the accompanying claims.

I claim:

1. A thermostat, comprising:
   terminals receiving input signals indicating an inside temperature and humidity, an outside temperature and humidity and a storage plenum temperature and humidity;
   terminals providing control signals for one or more actuators, selected from the group consisting of a blower, an exhaust vent, a pressure control valve, a fresh air vent and a heat pump; and
   a control circuit that determines the magnitudes of the control signals based on a control algorithm based on the input signals; and
   a user interface for receiving from a user one or more control parameter values of the control algorithm, and for displaying for the user status and operational information.

* * * * *